(No Model.)

J. W. MALOY.
CUTTER HEAD FOR STONE CUTTING MACHINES.

No. 334,594. Patented Jan. 19, 1886.

Attests:
John G. Hinkel Jr.
H. E. Hansmann.

Inventor:
Jas. W. Maloy,
By Foster & Freeman
Attorneys.

UNITED STATES PATENT OFFICE.

JAMES W. MALOY, OF SOMERVILLE, ASSIGNOR, BY MESNE ASSIGNMENTS, TO THE AMERICAN MARBLE CUTTING COMPANY, OF BOSTON, MASS.

CUTTER-HEAD FOR STONE-CUTTING MACHINES.

SPECIFICATION forming part of Letters Patent No. 334,594, dated January 19, 1886.

Application filed December 15, 1884. Renewed November 27, 1885. Serial No. 184,126. (No model.)

*To all whom it may concern:*

Be it known that I, JAMES W. MALOY, a citizen of the United States, residing at Somerville, in the county of Middlesex and State of Massachusetts, have invented certain new and useful Improvements in Cutter-Heads for Stone-Cutting Machines, of which the following is a specification.

My invention relates to that class of cutter-heads usually employed for cutting stone, and adapted to be used for other purposes; and my invention consists in arranging circular cutting-disks upon studs extending from a hub at such an angle that the forward edges of the revolving cutters will alone be brought in contact with the surface to be cut, and so that the lower edges may be brought in close proximity, so as to secure a comparatively small bore or cut without unduly reducing the size of the cutter-disks.

Figure 1:
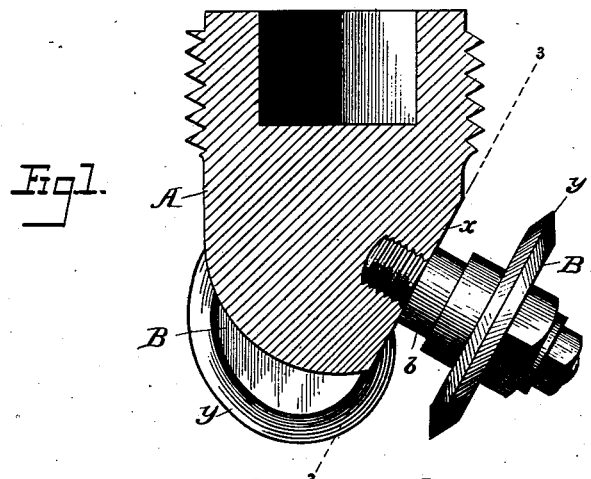
Figure 2:
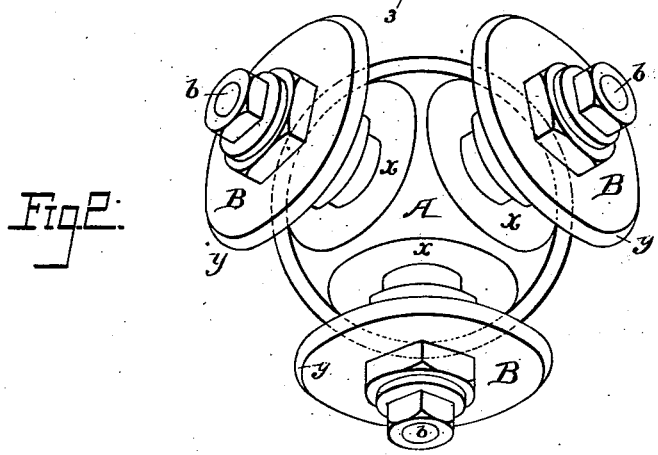
Figure 3:
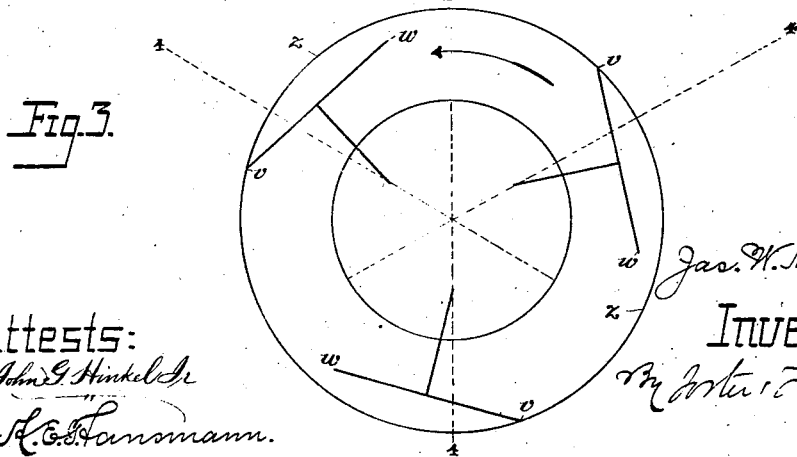

In the drawings, Figure 1 is a sectional elevation of my improved cutter-head. Fig. 2 is an inverted plan view. Fig. 3 is a diagram illustrating the angular arrangement of the disks, bearings, or studs.

A is the hub of the cutter, consisting of a block of metal adapted for attachment to the shaft of a stone-cutting machine, or other machine of like character, and beveled at the lower end so as to form three inclined equidistant faces, x x. Centrally from each face x extends a stud, b, upon which is mounted so as to rotate freely a cutter-disk, B, having beveled sides, forming a sharp-cutting edge, y. The studs b project from the faces x at right angles to the plane 3 3 of the said faces; but instead of being set to extend radially from the faces upon a horizontal plane upon the lines 4, as shown in the diagram, Fig. 3, they are set at an angle to the said radial lines, as shown in said figure, so as to throw out the forward edges, v, of the cutter-disks. The result of this angular arrangement of the studs and forward projection of the cutting-edges is to carry the rear edges, w, of the cutters away from the edge z, formed in the slab of stone or other material by the operation of the forward edges, v, of the said disk, thus leaving a clearance which prevents the cutter-disks from binding against the cut surface at the rear edges, so that the forward cutting-edges of the disks are the only part thereof brought into contact with the material cut.

By arranging the studs b at right angles to the faces x, as described, the lower edges of the cutters are projected inward and brought comparatively close together, even when large cutting-disks are employed, by which means a comparatively small bore or dish is made in the material without the friction and rapid wear which would result from the employment of small disks, so that by the rotation of the cutter-head and the movement of the slab of stone or other material to be cut the said slab may be channeled, grooved, or dished, so as to form almost any desired shape of depression in the slab.

It will of course be understood that each cutter may consist of two or more sharp-edged disks, and that any suitable form of studs or bearings for the cutter-disk may be employed.

It will be apparent that the hub may be provided with two, three, or more faces, the cutter-disks being arranged at the same angle as above described, whatever the number of faces and disks may be.

I do not here make any claim to a head provided with cutter-disks arranged on studs at a right angle or less than a right angle to the vertical axis of the head, as this forms the subject of a separate application for Letters Patent, filed December 15, 1884, No. 150,418.

Without limiting myself to the precise construction and arrangement of parts shown and described, I claim—

1. The combination, in a cutter-head, of a hub, circular cutting-disks, and studs supporting the said disks, extending laterally from the hub and arranged with the axis of the cutter parallel to but distant from a radial line extending from the axis of the cutter-head, to throw the forward cutting-edge of each disk farther from the center of the hub than the rear edge, substantially as and for the purpose set forth.

2. The hub A, having inclined equidistant faces $x$, and studs projecting from said faces at right angles to the plane 3 thereof, and parallel to radial lines crossing said faces at right angles, and cutter-disks carried by the said studs, substantially as specified.

In testimony whereof I have signed my name to this specification in the presence of two subscribing witnesses.

JAMES W. MALOY.

Witnesses:
GEORGE R. EAGER,
CHAS. M. TILLINGHAST.

Correction in Letters Patent No. 334,594.

It is hereby certified that Letters Patent No. 334,594, granted January 19, 1886, upon the application of James W. Maloy, of Boston, Massachusetts, for an improvement in "Cutter-Heads for Stone-Cutting Machines," was erroneously issued to "The American Marble Cutting Company;" that said Letters Patent should have been issued to *The American Marble Cutting Company of Maine, its principal place of business being in Boston, Massachusetts;* that this correction has been made in the records of the case in the Patent Office, and that the said Letters Patent should be read to conform thereto.

Signed, countersigned, and sealed this 3d day of August, A. D. 1886.

[SEAL.]

H. L. MULDROW,
*Acting Secretary of the Interior.*

Countersigned:
    R. B. VANCE,
        *Acting Commissioner of Patents.*